(12) United States Patent
Magnusson et al.

(10) Patent No.: US 10,302,137 B2
(45) Date of Patent: May 28, 2019

(54) BEARING ASSEMBLY

(71) Applicant: Taurus Technologies Group, Inc., Grimsby (CA)

(72) Inventors: Stefan Magnusson, Grimsby (CA); Marta Magnusson, Grimsby (CA); Maxine Magnusson, Grimsby (CA)

(*) Notice: Subject to any disclaimer, the term of this patent is extended or adjusted under 35 U.S.C. 154(b) by 0 days.

(21) Appl. No.: 15/695,921

(22) Filed: Sep. 5, 2017

(65) Prior Publication Data
US 2019/0072135 A1    Mar. 7, 2019

(51) Int. Cl.
*F16C 41/00* (2006.01)
*F16C 33/36* (2006.01)
*F16C 19/26* (2006.01)

(52) U.S. Cl.
CPC ............ *F16C 41/007* (2013.01); *F16C 19/26* (2013.01); *F16C 33/363* (2013.01); *F16C 2233/00* (2013.01)

(58) Field of Classification Search
CPC ........ F16C 19/26; F16C 19/362; F16C 27/04; F16C 27/066; F16C 29/0628; F16C 33/34; F16C 33/50; F16C 33/502; F16C 2233/00
See application file for complete search history.

(56) References Cited

U.S. PATENT DOCUMENTS

| | | | |
|---|---|---|---|
| 3,620,585 A * | 11/1971 | Anderson | F16C 19/26 384/491 |
| 3,748,004 A | 7/1973 | McKee | |
| 5,033,877 A * | 7/1991 | Bowen | F16C 19/26 384/567 |
| 8,210,754 B2 * | 7/2012 | Endres | F16C 19/26 384/567 |
| 2012/0020603 A1 * | 1/2012 | Stubenrauch | F16C 41/008 384/448 |

FOREIGN PATENT DOCUMENTS

| | | | |
|---|---|---|---|
| DE | 102009015439 A1 * | 10/2010 | ............ F16C 27/04 |
| JP | 60249722 A * | 12/1985 | ............ F16C 27/04 |

* cited by examiner

*Primary Examiner* — Phillip A Johnson
(74) *Attorney, Agent, or Firm* — Marc J. Whipple

(57) ABSTRACT

An improved bearing assembly is disclosed. Ring-shaped rolling elements in an alternating staggered formation, which allows maintenance of the bearing assembly geometry with fewer structural elements than prior bearings. The rolling elements can create a constant elastic tension, or pre-load, which maintains the bearing assembly geometry under various loads and rotational speeds, and reduces wear on the rolling elements and the raceways. The rolling elements can also comprise energy-dampening members and/or instrumentation which can monitor the functioning of the bearing assembly. An alternate embodiment in which the rolling elements are interlocked allows the use of more rolling elements in the same volume. An improved cage assembly, highly suitable for use with the improved bearing assembly, is also disclosed. The improved cage assembly comprises individual cage segments, which each retain one rolling element. The cage assembly can flex at every joint in a way not allowed by prior cage assemblies.

26 Claims, 9 Drawing Sheets

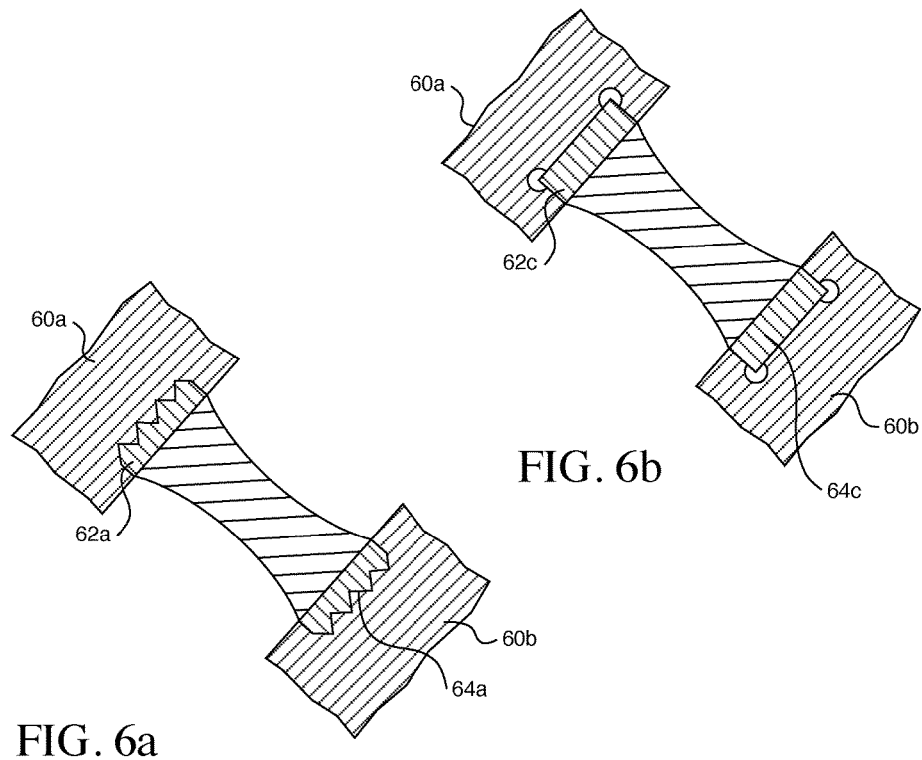
FIG. 6b
FIG. 6a
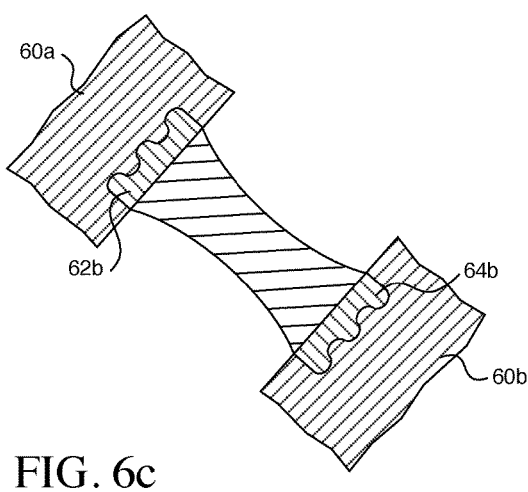
FIG. 6c

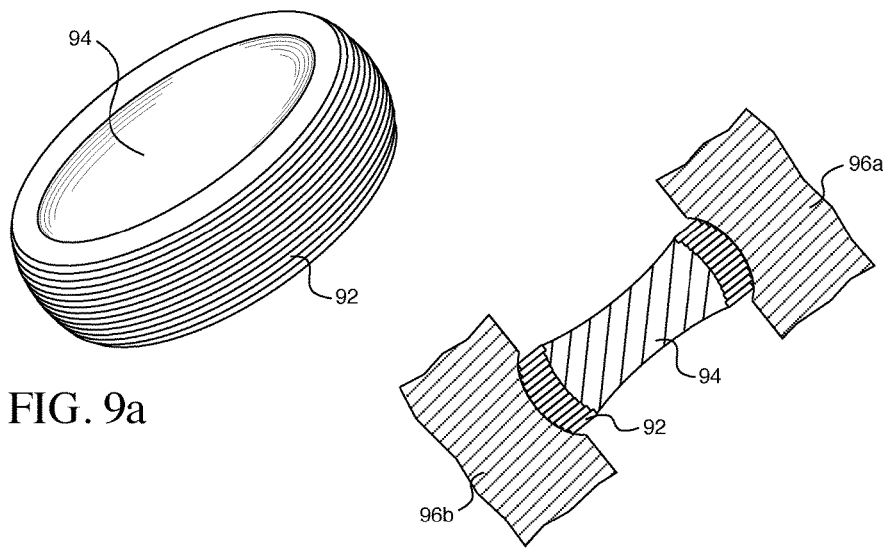
FIG. 9a
FIG. 9b
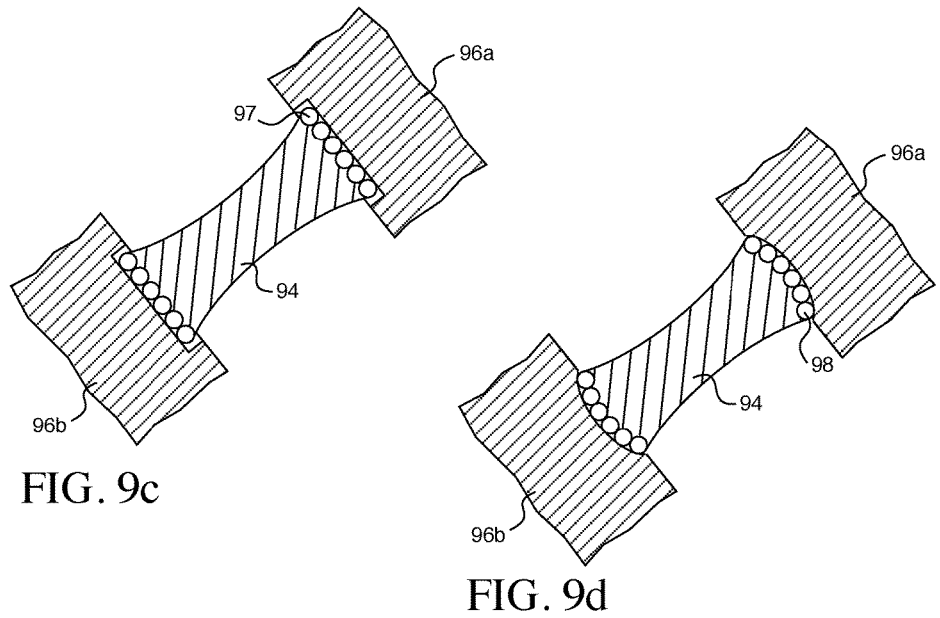
FIG. 9c
FIG. 9d

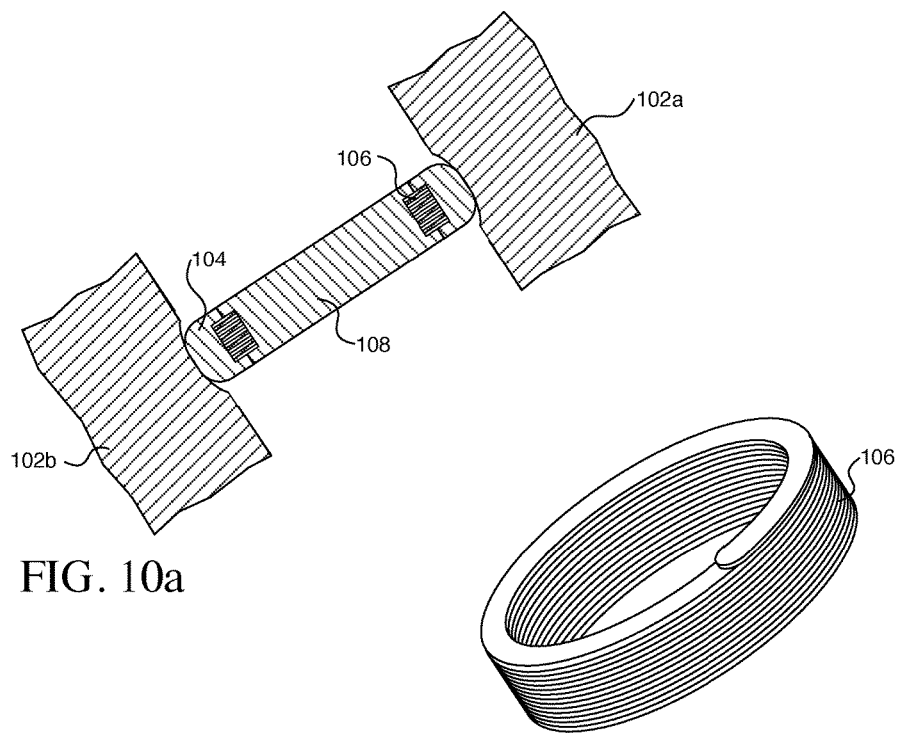
FIG. 10a
FIG. 10b
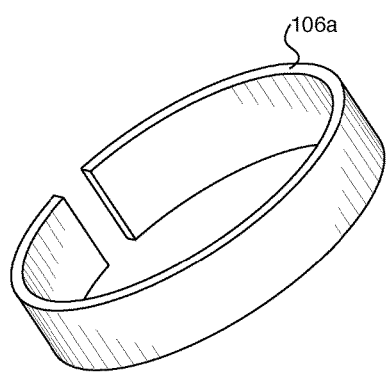
FIG. 10c

BEARING ASSEMBLY

This invention relates to an improved bearing assembly which allows rotary mechanisms to operate at higher speeds and accept higher rotary loads. The invention also allows greater tolerance in the manufacture and maintenance of the bearing assembly without loss of precision or durability. By using flexible rolling elements, a vast improvement in bearing performance and reliability is achieved. Performance enhancement is also provided by pre-loading the bearing with elastic tension using various configurations for the rolling elements.

BACKGROUND OF THE INVENTION

The present invention relates to an improved bearing assembly. Bearings, generally, are simply surfaces or interfaces where moving parts of a device interface with each other in a non-engaged fashion. (I.E. gears or pinions are not bearings for purposes of this context.) Historically, these surfaces have either slid against each other, or been provided with rolling elements which minimize sliding friction and wear. The standard example of the latter is the ballbearing, which incorporates one or more spherical rolling elements ("balls") which are captive between two rotating members of the device. Rather than have a direct planar or linear interface between the rotating members, the balls bear any mechanical load and allow the rotating members to spin freely against each other.

While ball bearings and similar devices incorporating rolling elements of various shapes (all hereafter balls, even if they are not spherical) are both well known in the art and highly useful, they have several shortcomings. First, such balls are solid and usually made of very hard, dense materials to improve load-bearing strength and durability. This means that they are highly inelastic, so when mechanical shocks are forced onto the system, the balls can gouge into the channels in the device through which they roll, be deformed themselves, or both. Over time this causes vibration and heat to build up due to less symmetrical rolling. Also, they must be made with extreme precision, as they cannot flex. This means that for high-speed, high-precision uses, ball bearings as currently used in the art are extremely difficult to manufacture. Any failure of precision will result in a bearing which wears out very quickly and may damage the larger device. A bearing assembly which did not suffer from these limitations would be a useful invention.

Another major shortcoming of ball bearings as currently practiced is that in high speed axial and radial loaded bearings, to maintain stability in three dimensions two rings of balls are necessary. If only one ring is used in such applications, the bearing will define a single plane, and can skew or cant even if it maintains a consistent planar shape in two dimensions. Thus four separate channels for the balls to roll in (hereafter generally "raceways," whether the bearing is self-contained or defined by channels in otherwise integral parts of the device) are required and a larger number of balls, any of which can be a point of failure, are required. A bearing assembly which did not suffer from this limitation would be a useful invention.

Finally, as the balls are solid, it is physically impossible for them to intersect each other. This means that only a single ball can ever take the load in any given ball-diameter length of the raceway, and functions as a major limiter on the number of balls which can be used in a bearing of any given size. Both of these limitations mean that a ball failing or departing from required tolerances has an effect which cannot be compensated for directly beyond certain limits. A bearing assembly which did not suffer from this limitation would be a useful invention.

It is common in the art for balls to be held captive in "cages," which are rigid structures which hold them at a fixed interval in the raceway. This insures proper spacing and prevents the balls from rubbing on each other, but adds a new potential point of failure. Cages are single pieces, of the appropriate diameter to fit within the raceway and hold the balls as specified without interfering with their rolling movement. If a cage breaks, bends, or warps, it can impair the efficiency of the bearing or even cause catastrophic failure. If this happens, the entire cage must usually be replaced, as they are also required to fit within specific precise tolerances. A bearing assembly incorporating a cage which did not suffer from this limitation would be a useful invention.

The present invention addresses these concerns.

SUMMARY OF THE INVENTION

Among the many objectives of the present invention is the provision of an improved bearing assembly which uses ring-shaped rolling elements.

Another objective of the present invention is the provision of an improved bearing assembly which uses ring-shaped rolling elements which can physically intersect each other.

Another objective of the present invention is the provision of an improved bearing assembly which uses ring-shaped rolling elements that provide a consistent elastic load under a variety of operating conditions.

Another objective of the present invention is the provision of an improved bearing assembly which uses coil-spring rolling elements to provide a consistent elastic load and energy absorption under a variety of operating conditions.

Yet another objective of the present invention is the provision of an improved bearing assembly which incorporates an improved rolling element cage.

BRIEF DESCRIPTION OF THE DRAWINGS

FIG. 6a depicts a cross-sectional view of an alternate embodiment of the ring rollers.

FIG. 6b depicts a cross-sectional view of an alternate embodiment of the ring rollers.

FIG. 6c depicts a cross-sectional view of an alternate embodiment of the ring rollers.

FIG. 9a depicts a perspective view of an alternate embodiment of the rolling elements.

FIG. 9b depicts a cross-sectional view of an alternate embodiment of the rolling elements.

FIG. 9c depicts a cross-sectional view of an alternate embodiment of the rolling elements.

FIG. 9d depicts a cross-sectional view of an alternate embodiment of the rolling elements.

FIG. 10a depicts a cross-sectional view of an alternate embodiment of the rolling elements.

FIG. 10b depicts a perspective view of an alternate embodiment of the rolling elements.

FIG. 10c depicts a perspective view of an alternate embodiment of the rolling elements.

DESCRIPTION OF THE PREFERRED EMBODIMENTS

Figure 1:
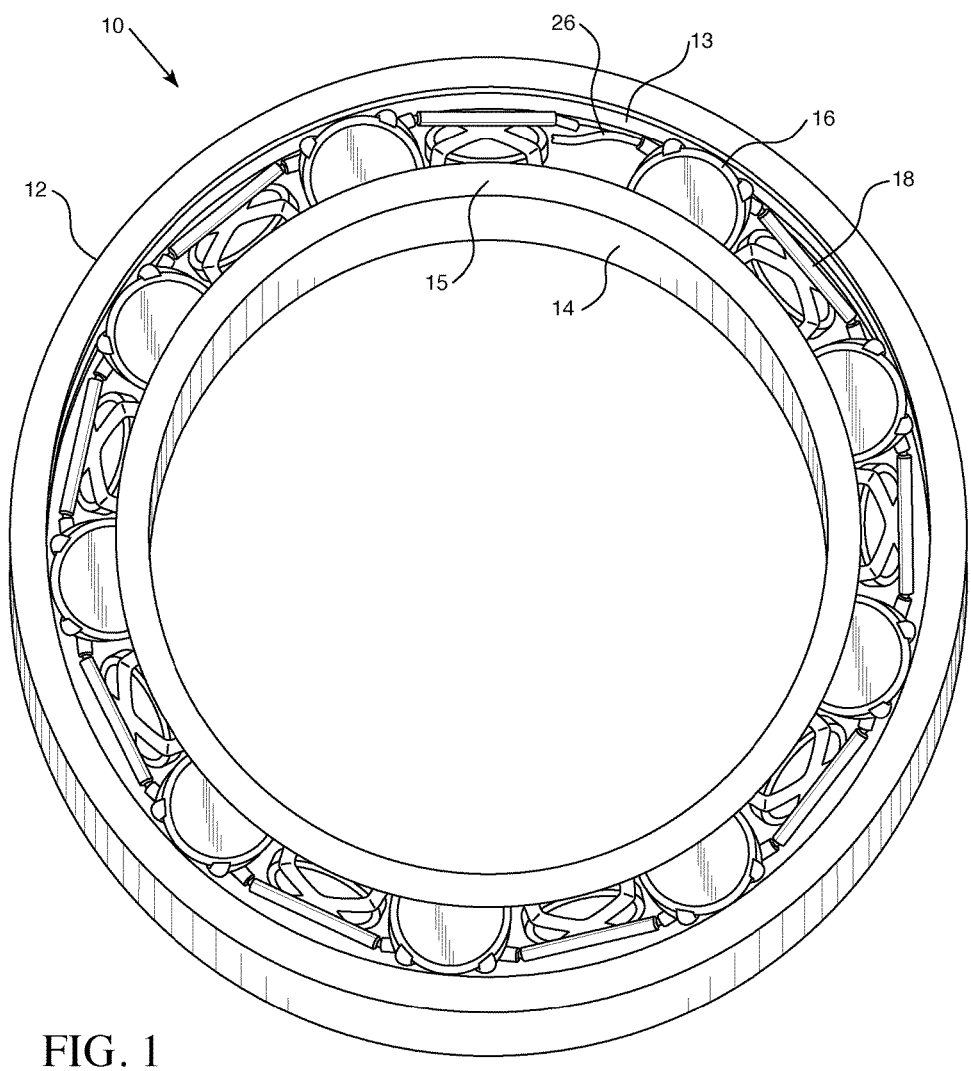
FIG. 1 depicts an overhead view of the improved bearing assembly.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

By referring to FIG. 1, the basic nature of the invention can be easily understood. FIG. 1 depicts the improved bearing assembly 10, comprising outer race 12 and inner race 14 (collectively, for purposes of describing the preferred embodiment, the "races.") In actual usage, outer race 12 and inner race 14 would both be operably affixed to some component of a larger device. For example, an axle (not shown) could be operably affixed to inner race 14 and a wheel (not shown) could be operably affixed to outer race 12. Between the races are a plurality of rolling elements, comprising ring rollers 16, which are tangential on their outer surfaces to outer raceway 13 and inner raceway 15 (not shown, see FIG. 3).

Ring rollers 16 are secured in a "cage." Unlike prior single-piece cages known to the art, the cage configuration preferred in the invention comprises a plurality of cage segments 18. The cage maintains proper spacing and ensures proper load distribution. Cage segments 18 are held in contact by cord 26. Note that a cage segment and its contained ring roller are missing from the drawing so that cord 26 can be seen: normally cord 26 would be entirely surrounded by the cord guide portion of the individual cage segments, except at the joints between them. Cord 26 can be fashioned of any appropriate material: a material which can be bonded is slightly preferred. A material which has extremely high tensile strength along its long axis is preferred. Cord 26 can be positioned on the inside, the outside, the top, or the bottom of the cage elements, depending on application and configuration. Likewise, the cage segments can be on the inside or the outside, relative to the axis of the ring rollers in relation to the axis of the bearing.

It is optional, but not preferred, to include some form of additional spacer between the cage segments for purposes of friction control, energy absorption, or other reasonable purpose. It is optional, but not preferred, to use a cage which is a single piece of material.

It is preferred that the combined diameter of the plurality of cage segments as defined by the sum of the lengths of cord guides 22 (not shown: see FIG. 2) be somewhat less than the diameter of outer raceway 13. Alternatively, if the cord guide 22 (not shown: see FIG. 2) is on the side of the cage segment closer to the inner raceway, it is then preferred for the combined diameter of the plurality of cage segments to be somewhat greater than the diameter of inner raceway 15. It is optional, but not preferred, for the plurality of cage segments to be connected on both the side closer to the outer raceway and the side closer to the inner raceway.

It should be noted that the ring rollers are offset on their axial planes in an alternating manner. I.E. every ring roller is offset in the opposite direction, relative to the radial axis of the bearing assembly, from the ones sequentially proximate to it. This means that collectively, the ring rollers' outer roller surfaces define a functionally two-dimensional contact surface between the inner and outer raceways. While it is optional not to incorporate this offset, if this is not done, the ring rollers' outer surfaces will collectively define a functionally one-dimensional contact surface. Such a surface can suffer damage or loss of precision from even very small canting, misalignment, or torqueing of the rolling elements, the raceways, or both. Traditionally, in precision bearing assemblies, this is overcome by the incorporation of at least two raceways, distributed along the axis of rotation of the bearing assembly. The offsetting of the ring rollers as shown solves the same problem without requiring the doubling (or more) of the number of raceways and rolling elements. There is no required level of axial offset, but an offset of at least one degree from the radial axis of the bearing assembly is preferred. It is strongly preferred that the offset not be more than forty-five degrees from the radial axis of the bearing assembly.

It is optional, but not preferred or required, to include more than two raceways per race, thus allowing more than two axial offsets for the ring rollers. For instance, if each race had four raceways, arranged at 30, 15, −15, and −30 degrees from the center rotational plane of the bearing, a set of ring rollers alternating at 30 degrees offset and 15 degrees offset could be used. Those sets could alternate between 30 and −30 and 15 and −15 degrees offset.

Figure 2:
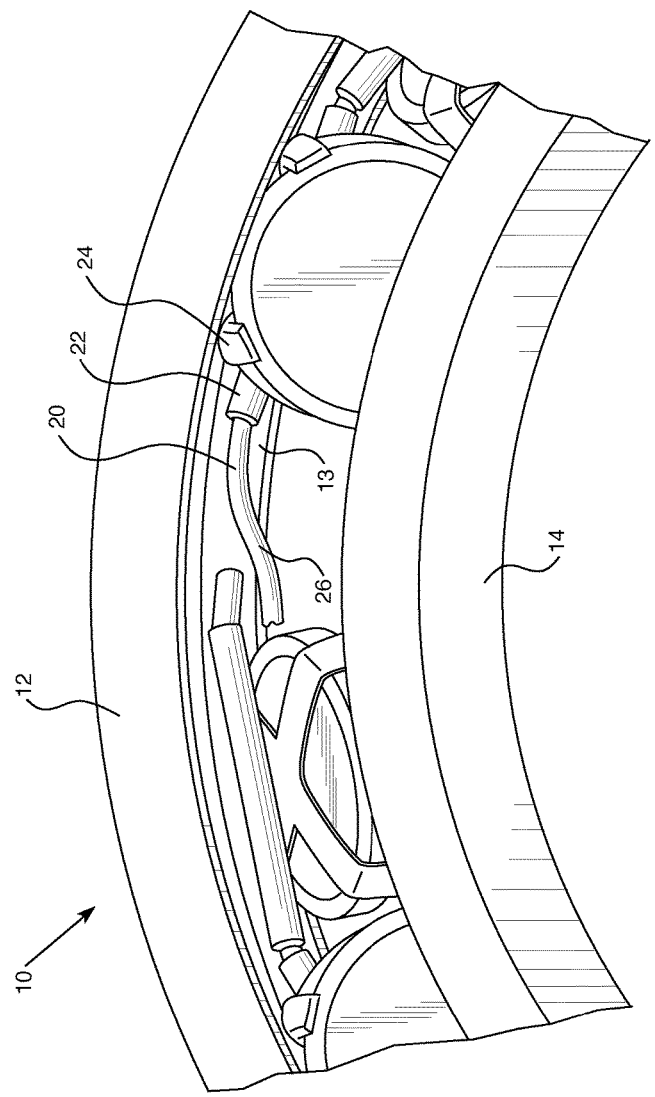
FIG. 2 depicts an overhead detail view of components of the improved bearing assembly.
Figure 3:
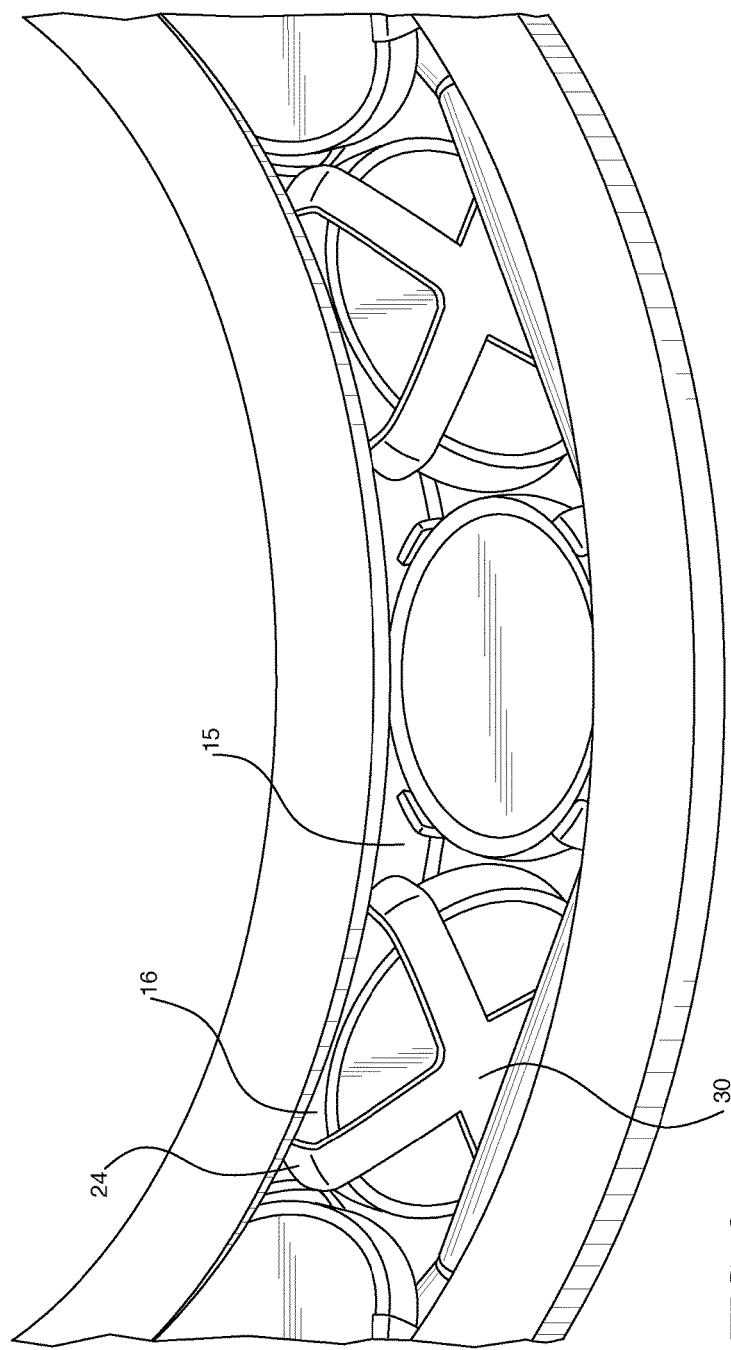
FIG. 3 depicts a second overhead detail view of components of the improved bearing assembly.

As is apparent from FIG. 1, and see also FIGS. 2 and 3, the ring rollers fit within circumscribed areas of the races. The raceways are created such that the alternating axial offset of the ring rollers is defined by the space that the ring rollers fit into within the races. The ring rollers cannot move outside the constraints of the raceways which are made to hold them in the desired axial offset orientation with great precision. The ring rollers can therefore only rotate about their axes and cannot pivot, roll, or yaw, which maintains the axial offset orientation and minimize the freedom of movement of the bearing assembly. This reduces wear and vibration.

FIG. 2 shows details of the ring rollers and the cage elements, as well as the construction of the cage. Cage elements 18 comprise body members 30, (not shown: see FIG. 3) which are formed in the shape of an X with retaining members 24 on each end of the X. Retaining members 24 wrap around and retain ring rollers 16, maintaining their preferred spacing. It is required that retaining members 24 be configured such that ring rollers 16 can roll freely within them without being likely to be ejected from cage elements 18. It is highly preferred that retaining members 24 be formed of a smooth, low-friction material. If this is not the case, cage elements 18 will wear out very quickly and may degrade, which in turn may degrade the performance of the bearing assembly.

Affixed to each retaining member 24 is a cord guide 22. Cord 26 goes through all of the cord guides and forms all of the cage elements 18 into a singular cage assembly. It is preferred that the tangent ends of cord guides 22 be configured so as to maximize the flexibility of the cage assembly. It is optional to put some sort of intermediate wear/strain/elasticity member between each individual cord guide 22. It is preferred that cage elements 18 be configured such that cord guides 22 have a central axis which bisects the offset angle between alternating ring rollers when the bearing assembly is assembled. This will maximize the tendency of the ring rollers to stay in the proper alignment and minimize wear on cord 26.

FIG. 3 shows an alternate detail view of the bearing assembly. Body member 30 of each cage element 18 can be clearly seen, and the means by which the cage assembly maintains the spacing of ring rollers 16 is apparent. Inner raceway 15 can also be observed.

The use of ring rollers with a predetermined elastic tension or "pre-load" is a key element of the invention. To define pre-load, it is necessary to consider the load as measured by the amount of radial compression of the ring rollers. For instance, if the bearing when assembled has zero pre-load, the ring rollers are designed to fit within the raceways such that to the desired level of precision, the outer diameter of the ring roller at the point of contact is equal to the distance between the surface of the inner and outer raceways when there is no external load on the bearing. Note that while factors such as atmospheric pressure and the temperature of the components of the bearing must be taken into account for practical engineering purposes, for purposes of this application it will be assumed that load is purely a function of the weight the bearing is being asked to bear (such weight being the "external load.")

For purposes of the description of the preferred embodiment it will be assumed that the external load can be considered distributed along the "bottom" half of the bearing, where the bottom is the half of the bearing closest to the ground and the top is the half of the bearing farthest from the ground. If gravity is not the sole source of the external load, the "bottom" half is the half of the raceway which the acceleration due to the external load centers upon.)

Once an external load is placed on the bearing, again assuming zero pre-load the ring rollers in the bottom will be compressed by some amount when they bear load and the ring rollers on the top will be able to move between the raceways to some extent. This is due to the fact that the compression of the ring rollers on the bottom will allow the inner race to move "down," toward the bottom, and thus the distance between the raceways in the top will become greater than the diameter of the outer circumference of the ring rollers. This has multiple negative effects on the performance of the bearing, including but not limited to, the fact that every time a ring roller goes from the top to the bottom, it will impact the surface of the raceways, causing degradation of the ring rollers, the raceways, or both.

To measure load in distance, the load is defined as the amount that the ring rollers in the bottom, either on average or at the point of maximum compression as desired, will be compressed when the bearing is under maximum external load. For example, the bottom-most ring roller might be compressed 10 microns under maximum external load: the load is then defined as a 10 micron load.

In the preferred embodiment, the ring rollers have a slightly larger outer diameter at the point of contact than the distance between the inner surfaces of the raceways when no external load is applied, and must be compressed when inserted into the raceways. They will then always be under load, even when the bearing is bearing no external load. This load is called the pre-load. For example. If the outer diameter of the ring rollers is 30 microns larger than the distance between the inner surfaces of the raceways, this is a 30 micron pre-load.

It is strongly preferred, but not required, that the pre-load of the ring rollers be greater than the load when the bearing is bearing an external load. That is, if the external load is 10 microns, the pre-load should be greater than 10 microns. If this is done, the ring rollers will never lose contact with the raceways, greatly reducing vibration and impact and generally improving the performance and durability of the bearing assembly as a whole.

While the relationship between the load and the pre-load will vary by application, it is preferred, but not required, that the pre-load should be at least 1.5 times the load. It is required that the ring rollers be constructed such that they can be pre-loaded and flex between the minimum load and the maximum load without experiencing undue degradation in strength or performance over a reasonable operating lifetime.

Figure 4:
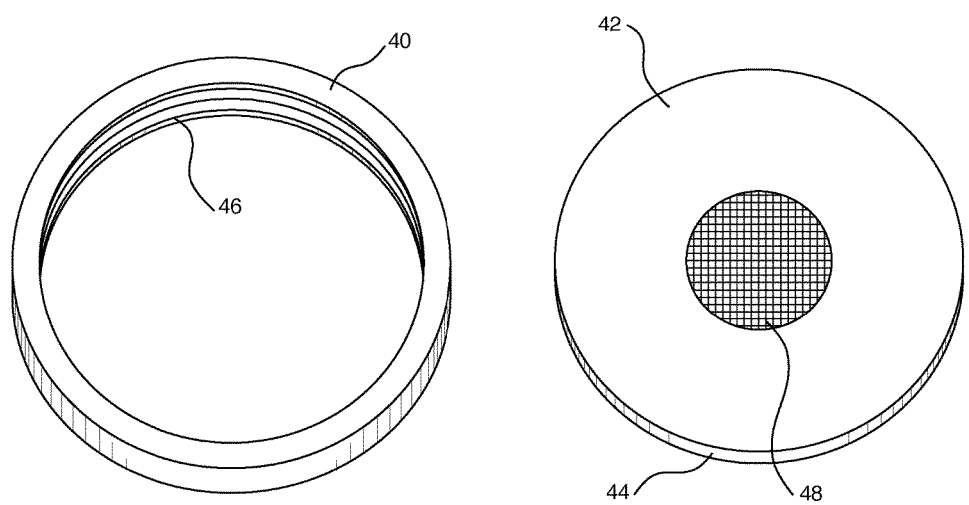
FIG. 4 depicts an overhead view of the ring rolling elements of the improved bearing assembly.

FIG. 4 shows details of the components of ring rollers 16. Ring 40 has an interior surface 46. Elastomeric center 42 has been removed from ring roller 16: when assembled, elastomeric center 42 would be located within ring 40, with radial surface 44 in contact with interior surface 46. The inclusion of elastomeric center 42, or of any center material, is preferred but not required in most applications. Ring 40 can be a single piece of material with a hollow center and no interior reinforcement or material of any kind. If included, it is preferred, but not required, that elastomeric center 42 comprise an elastic material capable of absorbing vibration and shock, supporting ring 40 while allowing it to retain a level of compressibility which would otherwise not be feasible without such interior support. This also minimizes vibrational disturbance at high speeds. It is optional to choose the density and elasticity of the material comprising elastomeric center 42 such that it will be most effective at absorbing and dispersing vibrations—essentially, sound waves—in the frequencies most likely to be associated with the environment and operating parameters expected during the operation of that particular bearing assembly. Likewise, it is optional to shape the profile of interior surface 46 such that ring 40 will have a cross-section optimized for the parameters of operation. This also allows the optimization of its contact with radial surface 44. The cross section of ring 40 and profile of interior surface 46 can be optimized to provide maximum compression strength, minimum angular momentum, optimal temperature dispersal or for the optimal combination of these and other properties.

Optional center element 48 could be a second elastomeric material, allowing for multiple elastomeric properties and/or rotational inertia profiles, or a sensor insert. A sensor can also simply be embedded in or attached to elastomeric center 42 at any desired position. Such a sensor can transmit any desired sensor data to a receiving and monitoring device. This data could include, but is not limited to:

1) Positional data, including positional data that allows measurement of rotational velocity and/or assessment of the variance in alignment as the bearing assembly rotates;
2) Temperature data;
3) Compression data; and/or
4) Time-in-operation data for that particular ring roller.

While it is preferred to locate such sensors at the center of the ring rollers, they can be attached to any suitable point of the ring roller assembly, or to the cage elements, or in any other reasonable location.

Figure 5:
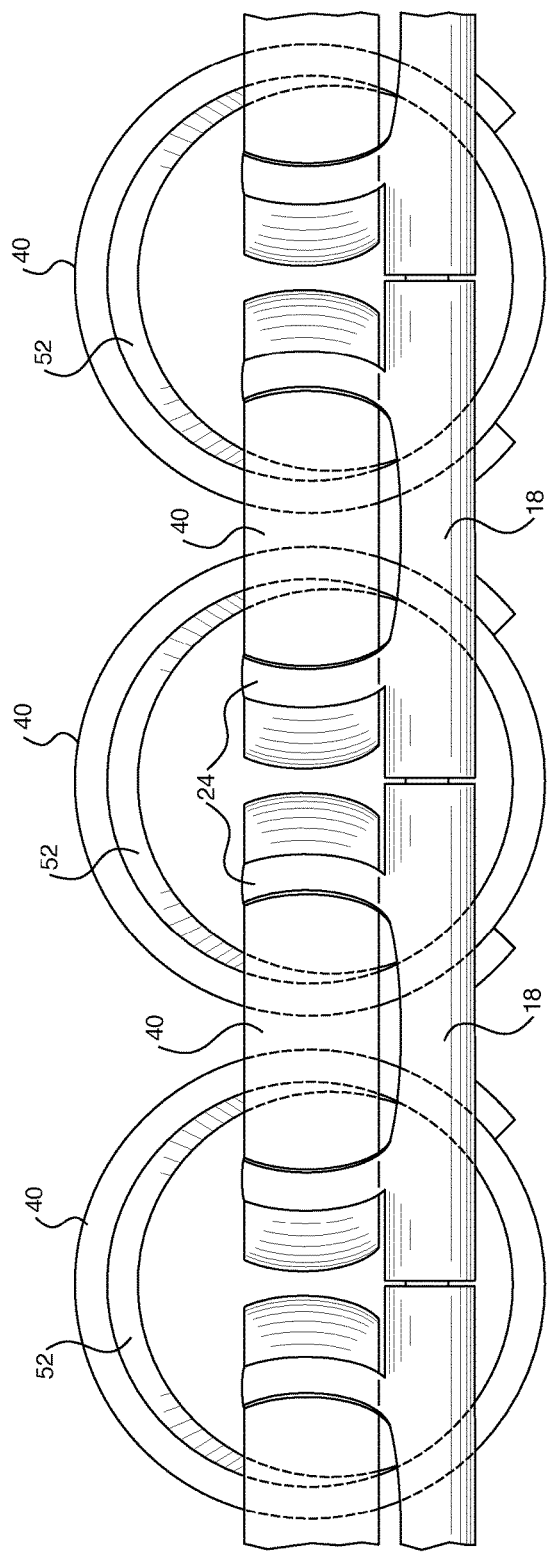
FIG. 5 depicts an overhead view of an alternate embodiment of the improved bearing assembly.

FIG. 5 shows an alternate embodiment of the ring roller portion of the bearing assembly. Here, the ring rollers are now interlocked. This allows them to intersect each other while in operation. Rings 40 pass through each other at their centers: the cage assembly maintains the proper spacing by securing the ring rollers with retaining members 24. While the ring rollers can still incorporate elastomeric centers, it is now required that the elastomeric enters not reach the center of the ring rollers, but rather that there be enough empty space at the center of the ring rollers such that they can all roll without contacting each other either on their outer surfaces or at their inner intersections. Such elastomeric centers are shown as ring elastomeric centers 52. This allows the use of more ring rollers in the same length of raceway/same size bearing assembly without reducing their size, strength, thermal mass, or contact area. The configuration of cage elements 18 must be changed to allow this configuration to function. While any reasonable configuration can be used, in this embodiment two cords can be used, with optional spacing members, with one cord attaching the cage elements of all ring rollers with the same axial offset, and the other attaching, with optional spacers, the ring rollers with the other axial offset.

FIGS. 6a, 6b, and 6c show alternate embodiments for the interface between the ring rollers and the elastomeric centers. In each example, the inner surface of the ring roller is shown as ring material 60a-b and the outer surface of the elastomeric center is shown as elastomeric material 62a-c with the interface between them shown as profile 64a-c. Profile 64a creates an interface with a "sawtooth" profile, which creates a greater area of contact and makes it less likely that the elastomeric center will move along the axis of rotation. Profile 64b likewise creates a greater area of contact, but avoids the sharp inflection points of profile 64a. Profile 64c has less surface contact, but provides elastomeric material 62c with a shape which is easier to manufacture, easier to engage and disengage, and has the most mass behind every point of contact. Which profile shape—including but not limited to those shown as profiles 64 (a-c)—is used will vary with the specific application and environmental requirements. It should be noted that while elastomeric materials 62a-c are shown as solid with a curving central profile, they can be rectangular, shaped in any way desired which does not interfere with the operation of the bearing assembly, or even have open centers as shown in FIG. 5.

Figure 7:
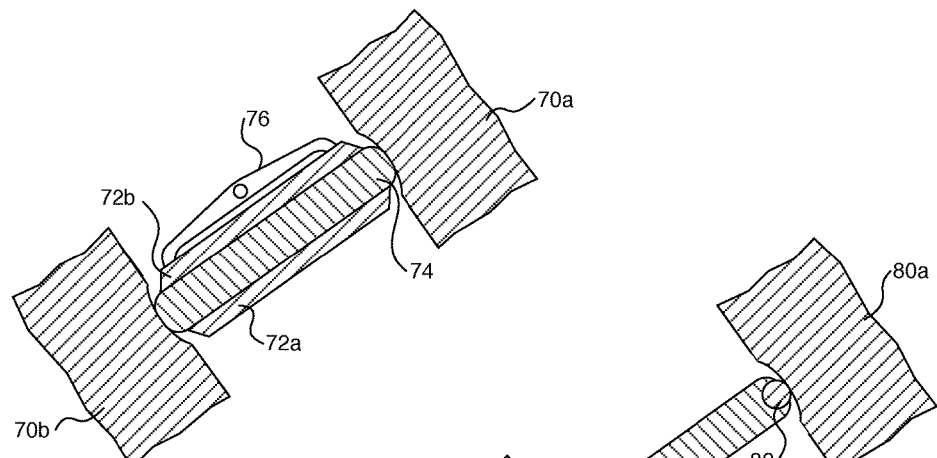
FIG. 7 depicts a cross-sectional view of an alternate embodiment of the rolling elements.

FIG. 7 shows an alternate embodiment of the rolling elements. Disc 74, formed of a solid piece of material, forms the body of the rolling element, which is in contact with inner raceway 70a and outer raceway 70b. Elastic dampeners 72a and 72b are affixed to the outer surfaces of disc 74, providing vibration dampening. Cage element 76 maintains the proper spacing of disc 74 with the other discs (not shown) comprising the rest of the rolling elements.

Figure 8A:
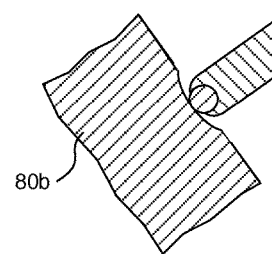
FIG. 8a depicts a cross-sectional view of an alternate embodiment of the rolling elements.
Figure 8B:
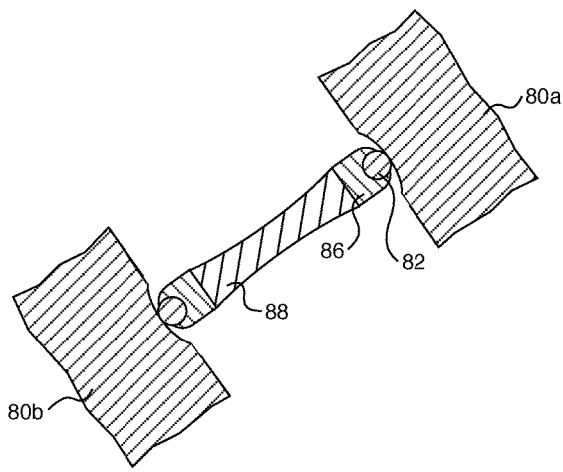
FIG. 8b depicts a cross-sectional view of an alternate embodiment of the rolling elements.

FIGS. 8a and 8b show an alternate embodiment of the rolling elements. Disc 84, formed of a solid piece of material, forms the body of the rolling element in FIG. 8A. Outer ring 82 surrounds the circumference of disc 84 and is in contact with inner raceway 80a and outer raceway 80b. Outer ring 82 can be replaced when worn, when the application of the bearing assembly changes, or to test the suitability of various materials for contact with the raceways without replacing the entirety of the rolling element. In FIG. 8b, disc 84 is replaced with inner ring 86. Optional elastomeric material 88 is affixed or otherwise inserted into inner ring 86 and provides additional dampening, energy absorption, and/or elastic compression resistance to the rolling element.

FIGS. 9a and 9b show two alternate embodiments of the rolling elements. In FIG. 9a, the rolling element comprises flat coil spring section 92 and optional elastomeric material 94. When this embodiment is used as a rolling element, it is configured as in FIG. 9b. Flat coil spring section 92, as rolling element, is in contact with outer raceway 96b. Flat coil spring section 92 can have a constant outer circumference, or can have a maximum outer circumference at its center and then a gradually decreasing outer circumference such that if outer raceway 96b and inner raceway 96a have a round cross section (as seen in FIG. 9b) it will more closely conform to such round cross section.

Instead of a flat coil spring, a coil spring formed of round wire can be used as seen in FIGS. 9c and 9d. As in FIGS. 9a and 9b, the rolling element has an optional elastomeric center 94. In FIG. 9c, wire coil spring section 97 has a constant outer circumference, meant to interface with the relatively rectangular cross section of the raceways. In FIG. 9d, wire coil spring section 98 has a central coil which is of a maximum outer circumference, and then the coils gradually diminish in outer circumference as they move out from the central coil. This produces a curved outer circumference for wire coil spring section 98 which is meant to interface with the round cross section of the raceways in FIG. 9d.

FIGS. 10a, 10b, and 10c show two alternate embodiments of the rolling elements. Ring roller 104 interacts with inner raceway 102a and outer raceway 102b, and functions as in previously described embodiments. Inside ring roller 104 is spring element 106, which provides additional compression resistance, elastic tension, and/or vibration dampening and energy absorption to the rolling element. Optional elastomeric material 108 functions as in previously described embodiments. FIG. 10b shows a flat coil spring section 106 which could be used as the spring element of the rolling element, whereas FIG. 10c shows an alternate c-spring 106a which could likewise be used. Selection of the spring element will depend on the configuration and usage of the bearing assembly as well as economic factors.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

What is claimed and sought to be protected by Letters Patent is:

1. A bearing assembly comprising:
   a) A raceway, comprising an inner bearing surface and an outer bearing surface;

b) At least two ring rollers, the at least two ring rollers being captive inside the raceway, each ring roller having an inner roller surface and an outer roller surface, the outer roller surface coming into contact with the outer bearing surface and the inner bearing surface;

c) A cage, the cage comprising at least two individual cage segments, each individual cage segment comprising a cord channel and a retaining member, each retaining member retaining one of the at least two ring rollers; and, d) A cord, the cord passing through each cord channel.

2. The bearing assembly as in claim 1, further comprising:

a) At least two elastomeric centers, the at least two elastomeric centers located inside the at least two ring rollers and affixed to the inner roller surfaces thereof.

3. The bearing assembly as in claim 2, wherein the at least two ring rollers each have a defined axial plane, and where the defined axial plane of any one of the at least two ring rollers is offset from the defined axial plane of any of the at least two ring rollers sequentially proximate to it in the raceway.

4. The bearing assembly as in claim 3, wherein the at least two ring rollers have an external diameter, the external diameter being the distance between two diametrically opposed points on the outer roller surface, and the external diameter is larger than an average distance between the outer bearing surface and the inner bearing surface when an external load is not present, causing a pre-load to exist when the at least two ring rollers are present between the inner bearing surface and the outer bearing surface.

5. The bearing assembly as in claim 2, further comprising:

a) A sensor, the sensor operably affixed to at least one of the at least two elastomeric centers, the sensor being able to transmit a data signal to a data monitoring device.

6. The bearing assembly as in claim 2, wherein the at least two ring rollers have an external diameter, the external diameter being the distance between two diametrically opposed points on the outer roller surface, and the external diameter is larger than an average distance between the outer bearing surface and the inner bearing surface when an external load is not present, causing a pre-load to exist when the at least two ring rollers are present between the inner bearing surface and the outer bearing surface.

7. The bearing assembly as in claim 5, wherein the at least two ring rollers have an external diameter, the external diameter being the distance between two diametrically opposed points on the outer roller surface, and the external diameter is larger than an average distance between the outer bearing surface and the inner bearing surface when an external load is not present, causing a pre-load to exist when the at least two ring rollers are present between the inner bearing surface and the outer bearing surface.

8. The bearing assembly as in claim 1, wherein the at least two ring rollers each have a defined axial plane, and where the defined axial plane of any one of the at least two ring rollers is offset from the defined axial plane of any of the at least two ring rollers sequentially proximate in the raceway.

9. The bearing assembly as in claim 1, further comprising:

a) A sensor, the sensor operably affixed to at least one of the at least two ring rollers, the sensor being able to transmit a data signal to a data monitoring device.

10. The bearing assembly as in claim 1, wherein the at least two ring rollers have an external diameter, the external diameter being the distance between two diametrically opposed points on the outer roller surface, and the external diameter is larger than an average distance between the outer bearing surface and the inner bearing surface when an external load is not present, causing a pre-load to exist when the at least two ring rollers are present between the inner bearing surface and the outer bearing surface.

11. The bearing assembly as in claim 1 or claim 8 wherein the at least two ring rollers comprises at least two solid discs, and further comprising:

a) At least two first external dampeners, each of the at least two first external dampeners being affixed to a first face of one of the at least two solid discs; and, b) At least two second external dampeners, each of the at least two second external dampeners being affixed to a second face of one of the at least two solid discs.

12. The bearing assembly as in claim 1 or claim 8 wherein each of the at least two ring rollers comprises a solid disc, and further comprising:

a) An external ring member, affixed to a circumference of the solid disc.

13. The bearing assembly as in claim 1, further comprising:

a) At least two external ring members, each of the at least two external ring members affixed to the outer roller surface of the at least two ring rollers.

14. The bearing assembly as in claim 1, wherein at least one of the at least two ring rollers comprises a section of coil spring.

15. The bearing assembly as in claim 14 wherein the section of coil spring has a constant diameter along an axial dimension when the section of coil spring is not subject to external compression.

16. The bearing assembly as in claim 14 wherein the section of coil spring has a largest diameter at a center point along an axial dimension, and wherein the section of coil spring has a tapered geometry such that any diameter which is not the largest diameter is less than the largest diameter when the section of coil spring is not subject to external compression.

17. The bearing assembly as in claim 14 wherein the section of coil spring comprises a length of flat spring material having a width, wound about an axial dimension such that the width is orthogonal to the axial dimension.

18. The bearing assembly as in claim 14 wherein the section of coil spring comprises a length of round spring material wound about an axial dimension.

19. The bearing assembly as in claim 1 further comprising:

a) An internal spring element, the internal spring element contacting the inner roller surface, and the internal spring element having a maximum diameter, the maximum diameter being a largest diametrical measurement between two diametrically opposed points on an exterior surface of the internal spring element when the internal spring element is not compressed by external compression, wherein the maximum diameter is larger than a ring roller internal diameter, the ring roller internal diameter being a second diametrical measurement between any two diametrically opposed points on the inner roller surface.

20. A bearing assembly comprising:

a) A raceway, comprising an inner bearing surface and an outer bearing surface; b) At least two rolling elements, the at least two rolling elements being captive inside the raceway, each rolling element coming into contact with the outer bearing surface and the inner bearing surface;

b) A cage, the cage comprising at least two individual cage segments, each individual cage segment comprising a cord channel and a retaining member, each retaining member retaining one of the at least two rolling elements; and, c) A cord, the cord passing through each cord channel.

21. A bearing assembly comprising:

a) A raceway, comprising an inner bearing surface and an outer bearing surface; and, b) At least two ring rollers, the at least two ring rollers being captive inside the raceway, each of the at least two ring rollers having an inner roller surface and an outer roller surface, the outer roller surface of each of the at least two ring rollers coming into contact with the outer bearing surface and the inner bearing surface, and a first one of the at least two ring rollers having an interior space, the interior space comprising an empty volume axially located within the first one of the at least two ring rollers and bounded circumferentially by the inner roller surface of the first one of the at least two ring rollers, and a second one of the at least two ring rollers freely passing through the interior space such that the at least two ring rollers are linked and can roll in the raceway without the outer roller surfaces of the at least two ring rollers coming into contact.

22. The bearing assembly as in claim 21, further comprising:

a) A cage, the cage comprising at least two individual cage segments, each individual cage segment comprising a cord channel and a retaining member, each retaining member retaining one of the at least two ring rollers; and, b) A cord, the cord passing through each cord channel.

23. The bearing assembly as in claim 22, wherein the at least two ring rollers each have a defined axial plane, and where the defined axial plane of any one of the at least two ring rollers is offset from the defined axial plane of any of the at least two ring rollers sequentially proximate in the raceway.

24. The bearing assembly as in claim 21, wherein the at least two ring rollers each have a defined axial plane, and wherein the defined axial plane of any one of the at least two ring rollers is offset from the defined axial plane of any of the at least two ring rollers sequentially proximate in the raceway, and wherein the raceway defines at least two pairs of roller channels, each of the pairs of roller channels comprising an inner roller channel and an outer roller channel, the inner roller channel and the outer roller channel defining a captive rotational space such that the ring rollers cannot rotate in any dimension except along the defined axial plane.

25. The bearing assembly as in claim 21, wherein the at least two ring rollers have an external diameter, the external diameter being the distance between two diametrically opposed points on the outer roller surface when an external load is not present, and the external diameter is larger than an average distance between the outer bearing surface and the inner bearing surface, causing a pre-load to exist when the at least two ring rollers are present between the inner bearing surface and the outer bearing surface.

26. The bearing assembly as in claim 21, wherein the at least two ring rollers have an external diameter, the external diameter being the distance between two diametrically opposed points on the outer roller surface, and the external diameter is larger than an average distance between the outer bearing surface and the inner bearing surface when an external load is not present, causing a pre-load to exist when the at least two ring rollers are present between the inner bearing surface and the outer bearing surface.

* * * * *